United States Patent
Xiong et al.

(10) Patent No.: US 9,158,910 B2
(45) Date of Patent: Oct. 13, 2015

(54) PASSWORD RESETTING METHOD AND ELECTRONIC DEVICE HAVING PASSWORD RESETTING FUNCTION

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu-Kai Xiong, Shenzhen (CN); Xin-Hua Li, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 254 days.

(21) Appl. No.: 13/859,036

(22) Filed: Apr. 9, 2013

(65) Prior Publication Data
US 2013/0276077 A1    Oct. 17, 2013

(30) Foreign Application Priority Data
Apr. 11, 2012    (CN) .......................... 2012 1 0104394

(51) Int. Cl.
*G06F 21/45*    (2013.01)

(52) U.S. Cl.
CPC ........ *G06F 21/45* (2013.01); *G06F 2221/2131* (2013.01)

(58) Field of Classification Search
CPC ....... G06F 21/31; G06F 21/41; H04L 63/083; H04L 63/0876
See application file for complete search history.

(56) References Cited

U.S. PATENT DOCUMENTS

2008/0137861 A1* 6/2008 Lindmo et al. ................. 380/270
2011/0247055 A1* 10/2011 Guo et al. .......................... 726/4

* cited by examiner

*Primary Examiner* — Kambiz Zand
*Assistant Examiner* — Noura Zoubair
(74) *Attorney, Agent, or Firm* — Novak Druce Connolly Bove + Quigg LLP

(57) ABSTRACT

A computerized method for resetting a password of a user, the user uses an electronic device to access to an information system provided by a server according to a user ID of the user and the password. An index code and device information of the electronic device are stored in the server corresponding to the user ID. When the password is to be reset, the user ID and the index code are inputted by the user and the device information of the electronic device is acquired. A verification string is generated using the index code and the user ID inputted by the user and the acquired device information, and is sent to the server for verification, thereby requesting to reset the password.

16 Claims, 4 Drawing Sheets

PASSWORD RESETTING METHOD AND ELECTRONIC DEVICE HAVING PASSWORD RESETTING FUNCTION

BACKGROUND

1. Technical Field

Embodiments of the present disclosure relate to an electronic device and method for resetting a password of a user for accessing an information system provided by a server.

2. Description of Related Art

Many organizations provide various information systems (e.g., human resource information system and finance management system) to their staffs to manage information and resources. Each staff may have a user ID and a password to gain access to an information system. In order to provide maximum information security, a complex password such as consisting of numbers, letters, and particular characters is needed. However, the complex password is not easy to remember. When the password is forgotten by a staff, an administrator of the information system may need to help the staff to manually reset his/her password, which may be inconvenient. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
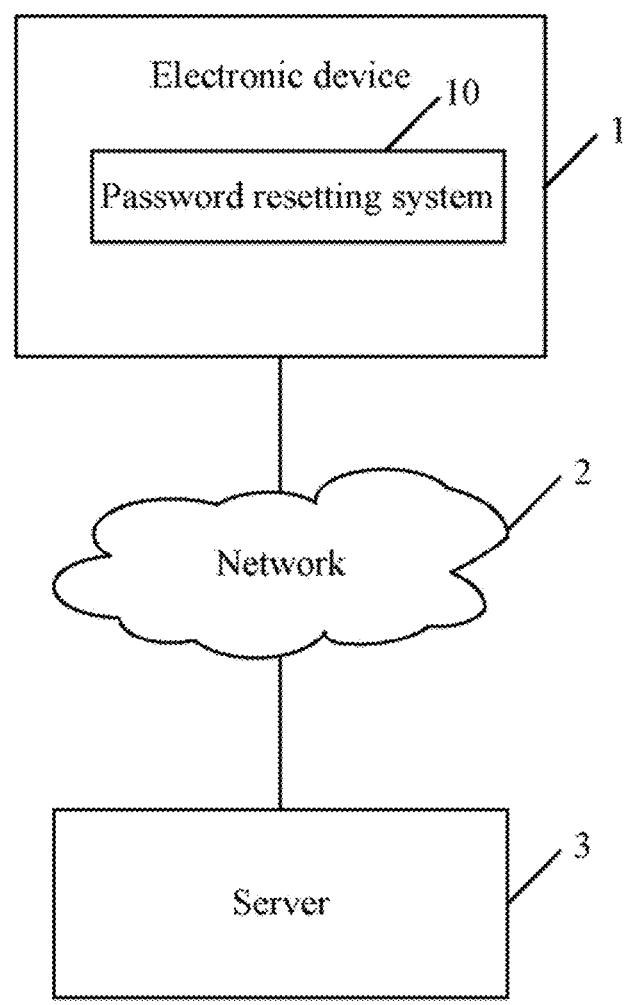
FIG. 1 is a schematic diagram illustrating one embodiment of an electronic device in communication with a server through a network.

FIG. 1 is a schematic diagram illustrating one embodiment of an electronic device 1 in communication with a server 3. In the embodiment, the electronic device 1 communicates with the server 3 through a network 2, which may be a wired network or a wireless network. The server 3 may be provided by an organization, such as a company. The server 3 provides an information system for the electronic device 1. The information system may be downloaded to the electronic device 1. Thus a user of the electronic device 1 can directly run the information system in the electronic device 1. In another embodiment, the user can remotely login to the server 3 through the network 2 and run the information system on the server 3. The electronic device 1 may be, for example, a portable computer, a desktop computer, or a smart phone. The information system is defined to be a computerized software system that is used to manage (e.g., collect, manage, process, transmit) various information and resources, such as human resource information system and finance management system used in various companies.

Figure 2:
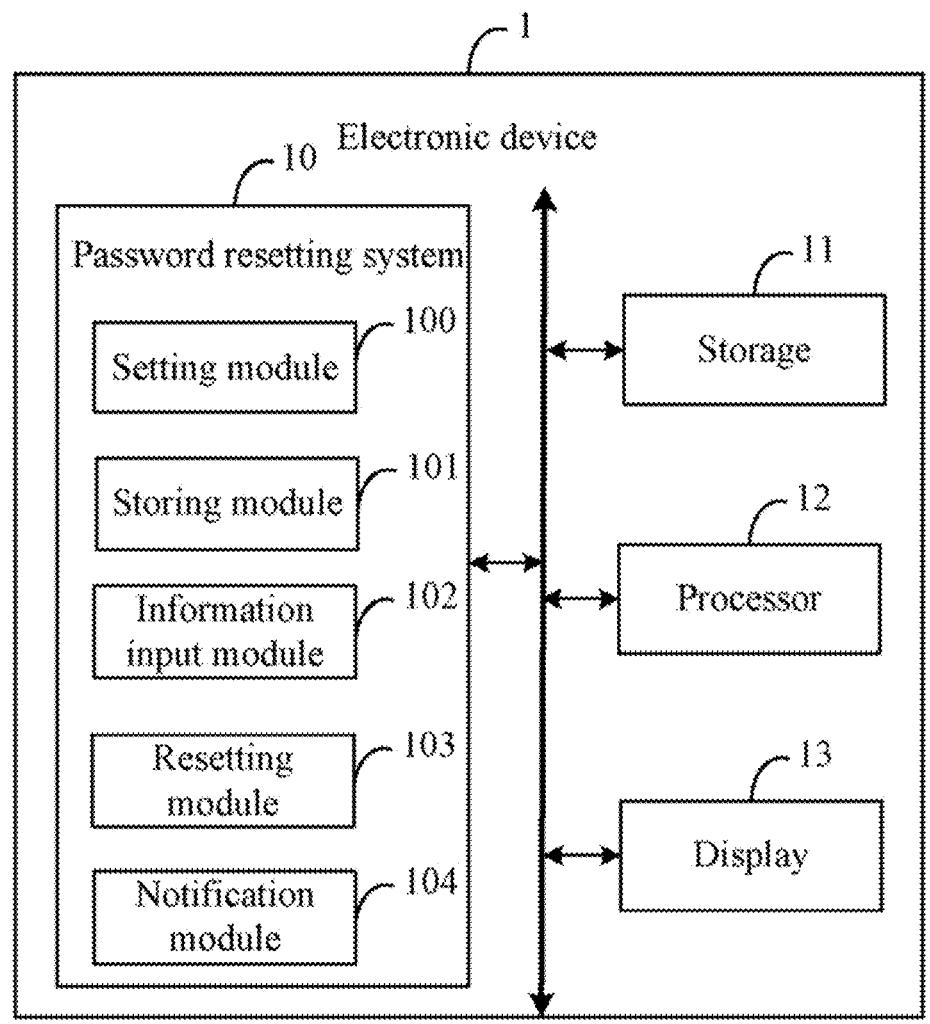
FIG. 2 is a schematic block diagram of the electronic device of FIG. 1.

FIG. 2 shows that the electronic device 1 includes a password resetting system 10, a storage 11, a processor 12, and a display 13. A user identifier (ID) of the information system can be registered from the server 3 using the electronic device 1, and a password associated with the user ID is set when the user ID is registered. Thus, the user can access the information system using the registered user ID and the password. The password resetting system 10 is configured for resetting the password associated with the user ID according to user requirements. The password resetting system 10 may include a plurality of programs in the form of one or more computerized instructions stored in the storage 11 and executed by the processor 12 to perform operations of the electronic device 1. In the embodiment, the password resetting system 10 includes a setting module 100, a storing module 101, an information inputting module 102, a resetting module 103, and a notification module 104.

In general, the word "module," as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 4:
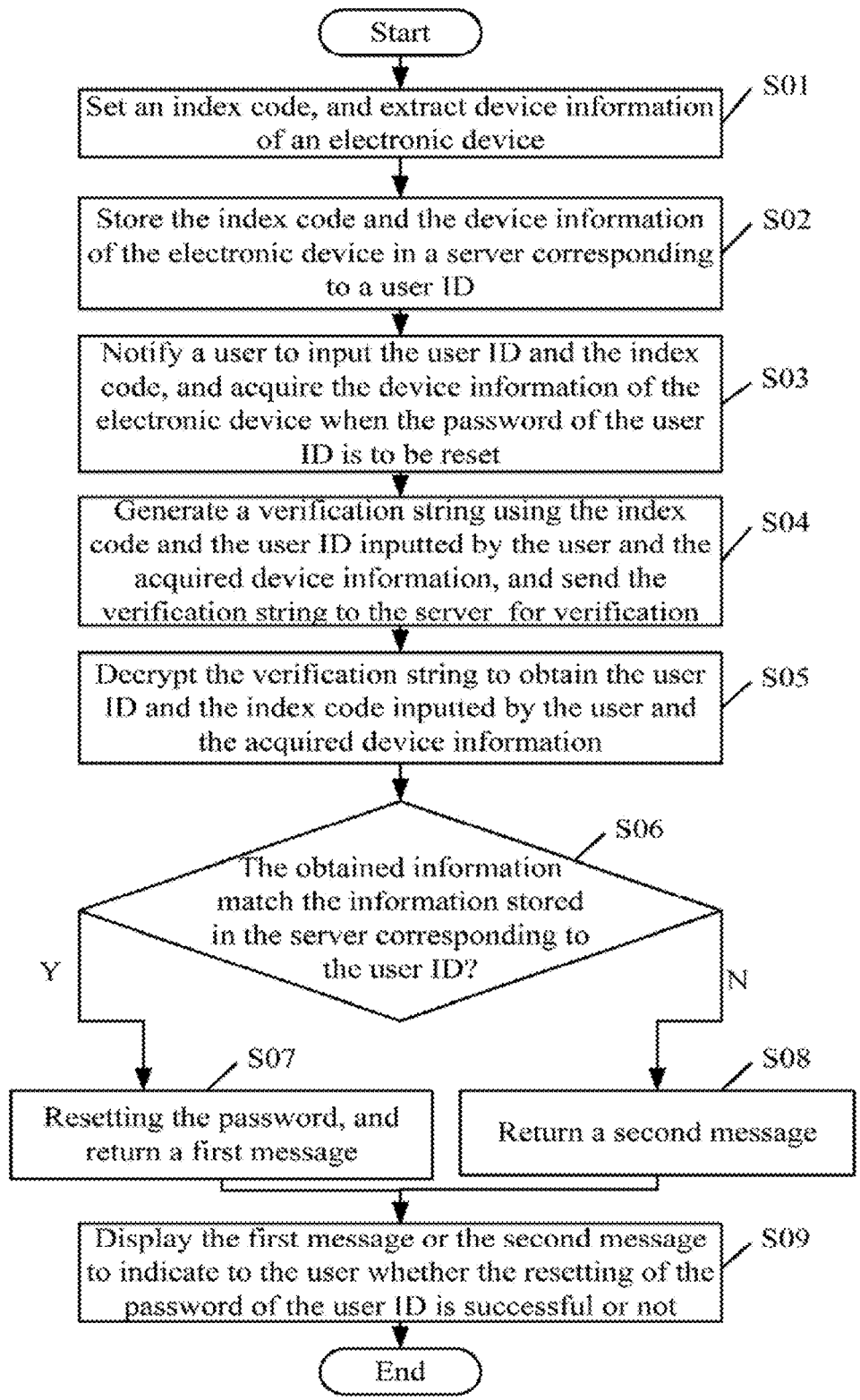
FIG. 4 shows a flowchart of one embodiment of a password resetting method for resetting a password of a user associated with a user ID for accessing an information system using the password resetting system of FIG. 2.

FIG. 4 shows a flowchart of one embodiment of a method for resetting the password of a user associated with the user ID for accessing the information system using the password resetting system 10 of FIG. 2. Depending on the embodiment, additional steps may be added, others removed, and the ordering of the steps may be changed.

In step S01, the setting module 100 sets an index code, and extracts device information of the electronic device 1. In the embodiment, the index code can be set by the user when the user ID is registered. The index code may consist of 2 to 6 characters (e.g., numbers or letters), which can be easily remembered by the user. The password associated with the user ID includes more characters than the index code. Therefore, the index is easier to be remembered than the password associated with the user ID. Particularly, the index code includes 4 characters, such as "1000". The device information may include at least one of a device name, an IP address, and a media access control (MAC) address of the electronic device 1.

Figure 3:
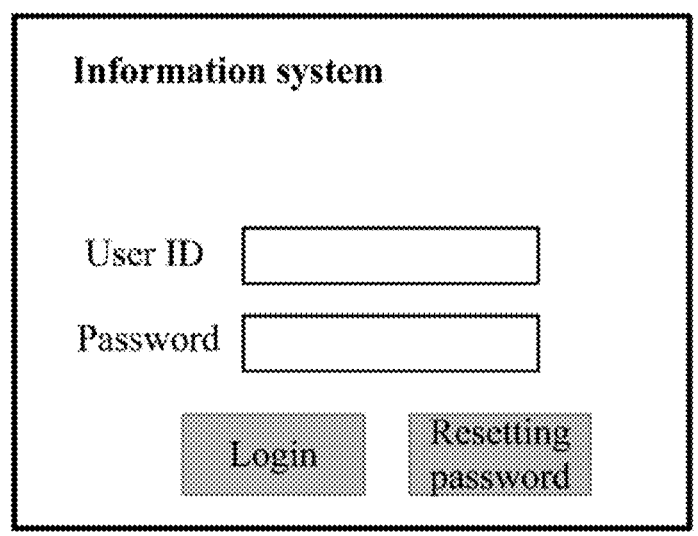
FIG. 3 is a schematic diagram showing a user interface of the electronic device.

In step S02, the storing module 101 stores the index code and the device information of the electronic device 1 in the server 3 corresponding to the user ID. When the index code and the device information are stored in the server 3 corresponding to the user ID, the user can request the server 3 to reset the password according to requirements. In one example, as shown in FIG. 3 an option button for resetting password is presented on a user interface of the information system, such as a login interface of the information system. When the user wants to reset the password associated with the user ID, the user can select the option button to activate the password resetting process.

In step S03, when the password associated with the user ID is to be reset, the information inputting module 102 notifies the user to input the user ID and the index code, and acquires the device information of the electronic device 1.

In step S04, the resetting module 103 generates a verification string using the index code and the user ID inputted by the user and the acquired device information, and sends the verification string to the server 3 through the network 2 for verification, thereby requesting to reset the password associated with the user ID.

In the embodiment, the resetting module 103 may generates the verification string as follows. First, the notification module 104 generates a random code and displays the random code on the display 13, to notify the user to input the displayed random code. Then, when the user input the displayed random code, the resetting module 103 generates the verification string by encrypting the user ID and the index code inputted by the user and the acquired device information using an encryption algorithm, such as a string interpolation algorithm. In the embodiment, the random code is used to strengthen password security of the information system.

In step S05, the server 3 decrypts the verification string using a decryption algorithm of the encryption algorithm to obtain the user ID and the index code inputted by the user and the acquired device information.

In step S06, the server 3 verifies whether the obtained index code and device information match the index code and the device information which are stored in the server 3 corresponding to the user ID. If the obtained index code and device information match the index code and the device information which are stored in the server 3 corresponding to the user ID, the procedure goes to step S07. Otherwise, the procedure goes to step S08.

In step S07, the server 3 resets the password associated with the user ID, and returns a first message indicating the password has been successfully reset to the electronic device 1, the procedure goes to step S09. In one embodiment, the server 3 may reset the password associated with the user ID to a default password. In another embodiment, the server 3 may remotely control the electronic device 1 to display a password resetting interface on the display and notify the user to input a new password, and then the password associated with the user ID is reset to the new password inputted by the user.

In step S08, the server 3 returns a second message indicating the resetting of the password failed.

In step S09, the notification module 104 displays the first message or the second message on the display 13 to indicate to the user whether the resetting of the password associated with the user ID is successful or not.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized password resetting method using an electronic device and a server, the electronic device in communication with the server to access an information system provided by the server, the method comprising:
   setting, by the electronic device, an index code and extracting device information of the electronic device;
   storing, by the electronic device, the index code and the device information of the electronic device in the server corresponding to a user identifier (ID) of the information system;
   notifying, by the electronic device, the user to input the user ID and the index code and acquiring the device information of the electronic device;
   generating, by the electronic device, a verification string using the index code and the user ID inputted by the user and the acquired device information;
   wherein the verification string is generated by:
      generating a random code and displaying the random code on a display of the electronic device to notify the user to input the displayed random code; and
      generating the verification string by encrypting the user ID and the index code inputted by the user and the acquired device information using an encryption algorithm, when the displayed random code is inputted by the user;
   and
   sending, by the electronic device, the verification string to the server for verification, thereby requesting the server to reset a password associated with the user ID of the information system;
   wherein the server resets the password associated with the user ID by:
      decrypting the verification string using a decryption algorithm to obtain the user ID and the index code inputted by the user and the acquired device information; and
      verifying whether the obtained index code and device information match the index code and the device information which are stored in the server corresponding to the user ID.

2. The method according to claim 1, wherein the device information comprises at least one of a device name, an internet protocol (IP) address, and a media access control (MAC) address of the electronic device.

3. The method according to claim 1, further comprising:
   resetting, by the server, the password associated with the user ID when the obtained index code and device information match the index code and the device information stored in the server corresponding to the user ID; and
   returning, by the server, a first message indicating the password has been successfully reset to the electronic device.

4. The method according to claim 3, wherein the server resets the password associated with the user ID to a default password.

5. The method according to claim 3, wherein the server controls the electronic device to display a password resetting interface and notifies the user to input a new password, and resets the password associated with the user ID to the new password inputted by the user.

6. The method according to claim 3, wherein the server returns a second message indicating the resetting of the password failed to the electronic device, when the obtained index code and device information do not match the index code and the device information stored in the server corresponding to the user ID.

7. The method according to claim 6, further comprising:
   displaying the first message or the second message on a display of the electronic device to indicate to the user whether the resetting of the password associated with the user ID is successful or not.

8. The method according to claim 1, wherein the electronic device communicates with the server through a wired network or a wireless network.

9. An electronic device in communication with a server to access an information system provided by the server, comprising:
   a storage;
   a processor; and
   one or more programs stored in the storage and executed by the processor, the one or more programs comprising:
   a setting module that sets an index code and extracts device information of the electronic device;
   a storing module that stores the index code and the device information of the electronic device in the server corresponding to a user identifier (ID) of the information system provided by the user;
   an information inputting module that notifies the user to input the user ID and the index code and acquires the device information of the electronic device, when a password associated with the user ID is to be reset; and a resetting module that generates a verification string using the index code and the user ID inputted by the user and the acquired device information, and sends the verification string to the server for verification, thereby requesting the server to reset the password associated with the user ID of the information system;

wherein the resetting module further generates a random code, displays the random code on a display of the electronic device to notify the user to input the displayed random code, and generates the verification string by encrypting the user ID and the index code inputted by the user and the acquired device information using an encryption algorithm when the displayed random code is inputted by the user;

wherein the server decrypts the verification string using a decryption algorithm to obtain the user ID and the index code inputted by the user and the acquired device information, verifies whether the obtained index code and device information match the index code and the device information which are stored in the server corresponding to the user ID.

10. The electronic device according to claim 9, wherein the device information comprises at least one of a device name, an internet protocol (IP) address, and a media access control (MAC) address of the electronic device.

11. The electronic device according to claim 9, wherein the server resets the password associated with the user ID when the obtained index code and device information match the index code and the device information stored in the server corresponding to the user ID, and returns a first message indicating the password has been successfully reset to the electronic device.

12. The electronic device according to claim 11, wherein server resets the password associated with the user ID to a default password.

13. The electronic device according to claim 11, wherein the server controls the electronic device to display a password resetting interface and notifies the user to input a new password, and resets the password associated with the user ID to the new password inputted by the user.

14. The electronic device according to claim 11, wherein the server returns a second message indicating the resetting of the password failed to the electronic device, when the obtained index code and device information do not match the index code and the device information stored in the server corresponding to the user ID.

15. The electronic device according to claim 14, wherein the one or more programs further comprise:

a notification module that displays the first message or the second message on a display of the electronic device to indicate to the user whether the resetting of the password associated with the user ID is successful or not.

16. The electronic device according to claim 9, wherein the electronic device communicates with the server through a wired network or a wireless network.

* * * * *